(12) United States Patent
Trockel

(10) Patent No.: US 9,694,540 B2
(45) Date of Patent: Jul. 4, 2017

(54) WATER SPORTS BOARDS HAVING PRESSURIZABLE / INFLATABLE BAFFLE CHAMBER STRUCTURES THEREIN, WHICH ARE MANUFACTURABLE BY WAY OF 3D PRINTING

(71) Applicant: Dale Forrest Trockel, Dillon Beach, CA (US)

(72) Inventor: Dale Forrest Trockel, Dillon Beach, CA (US)

(*) Notice: Subject to any disclaimer, the term of this patent is extended or adjusted under 35 U.S.C. 154(b) by 0 days.

(21) Appl. No.: 14/556,023

(22) Filed: Nov. 28, 2014

(65) Prior Publication Data

US 2015/0147926 A1  May 28, 2015

Related U.S. Application Data

(60) Provisional application No. 61/910,012, filed on Nov. 27, 2013.

(51) Int. Cl.

| | |
|---|---|
| *B63B 7/08* | (2006.01) |
| *B29C 67/00* | (2017.01) |
| *B63H 25/22* | (2006.01) |
| *B29K 101/12* | (2006.01) |
| *B29K 105/26* | (2006.01) |
| *B29L 31/52* | (2006.01) |
| *B33Y 10/00* | (2015.01) |
| *B33Y 80/00* | (2015.01) |
| *B63B 35/79* | (2006.01) |

(52) U.S. Cl.
CPC ......... *B29C 67/0051* (2013.01); *B63H 25/22* (2013.01); *B29K 2101/12* (2013.01); *B29K 2105/26* (2013.01); *B29L 2031/5272* (2013.01); *B33Y 10/00* (2014.12); *B33Y 80/00* (2014.12); *B63B 7/082* (2013.01); *B63B 35/7913* (2013.01)

(58) Field of Classification Search
CPC ............ B63B 35/79; B63B 2035/7903; B63B 35/7906; B63B 35/7913; B63B 7/00; B63B 7/08; B63B 7/82
USPC ................................ 114/345, 61.25; 441/74
See application file for complete search history.

(56) References Cited

U.S. PATENT DOCUMENTS

| | | | | |
|---|---|---|---|---|
| 1,456,168 A | * | 5/1923 | Witmer ..................... | B63B 7/08 182/139 |
| 4,998,494 A | * | 3/1991 | Deutsch .............. | B63B 35/7913 114/123 |

(Continued)

*Primary Examiner* — Andrew Polay

(57) ABSTRACT

A water sports board includes a top deck forming portions of an outer surface of the water sports board; an underside forming portions of the outer surface; a set of internal baffle chamber structures disposed between the top deck and the underside, each baffle chamber structure fluidically isolated from another baffle chamber structure and including a plurality of pressurizable/inflatable baffle elements therein having hollow elongate internal passages that are fluidically coupled to one another; and a set of inflation/deflation valves fluidically coupled to the set of baffle chamber structures, wherein each inflation/deflation valve is accessible from the outer surface of the water sports board. The water sports board can also include a concavity adjustment mechanism by which concavity of the underside of the water sports board is adjustable. Essentially the entire water sports board is manufacturable by way of 3D printing.

16 Claims, 17 Drawing Sheets

(56) References Cited

U.S. PATENT DOCUMENTS

| | | | |
|---|---|---|---|
| 7,146,923 B2* | 12/2006 | Polley | B63B 7/00 114/345 |
| 2009/0049757 A1* | 2/2009 | Potter | B64C 3/30 52/2.23 |
| 2015/0298406 A1* | 10/2015 | Costin | B63B 35/7913 428/12 |

* cited by examiner

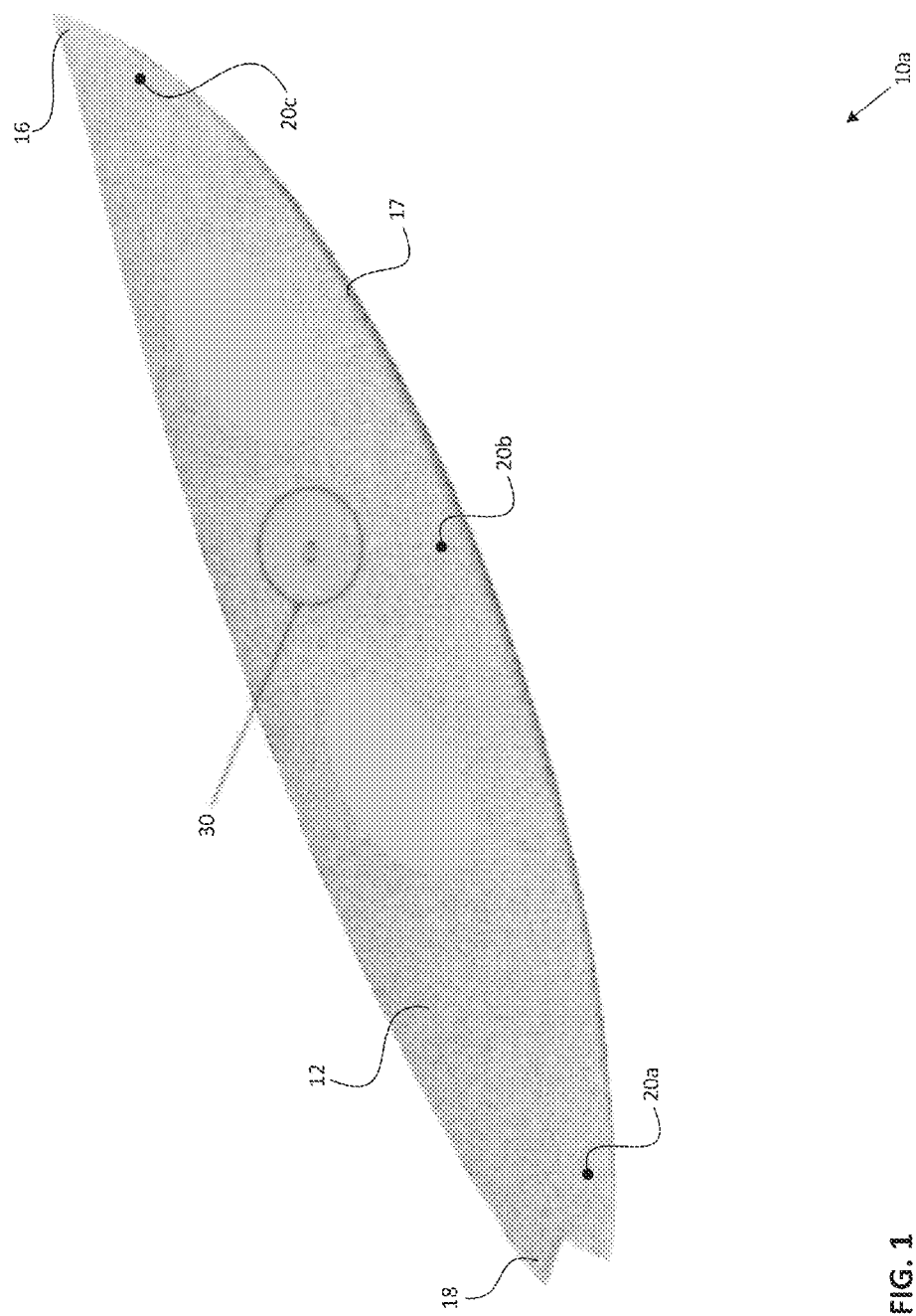

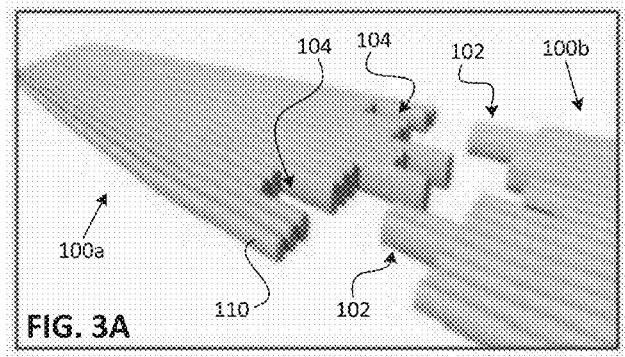
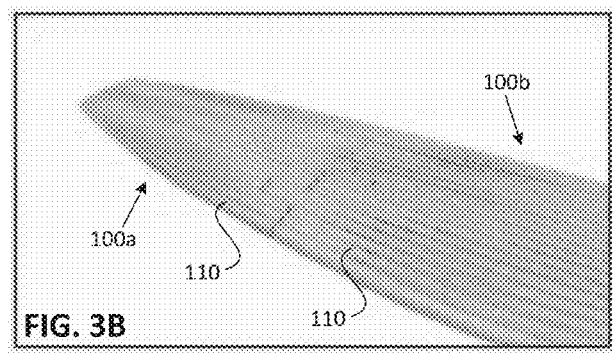
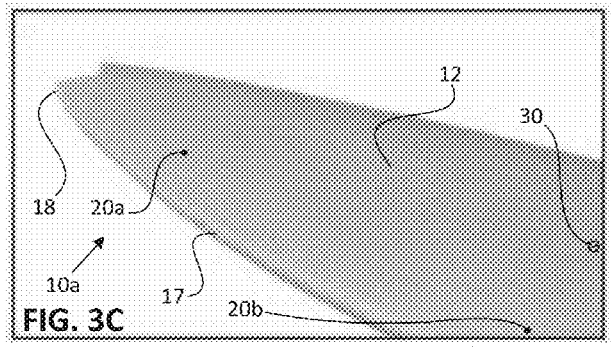

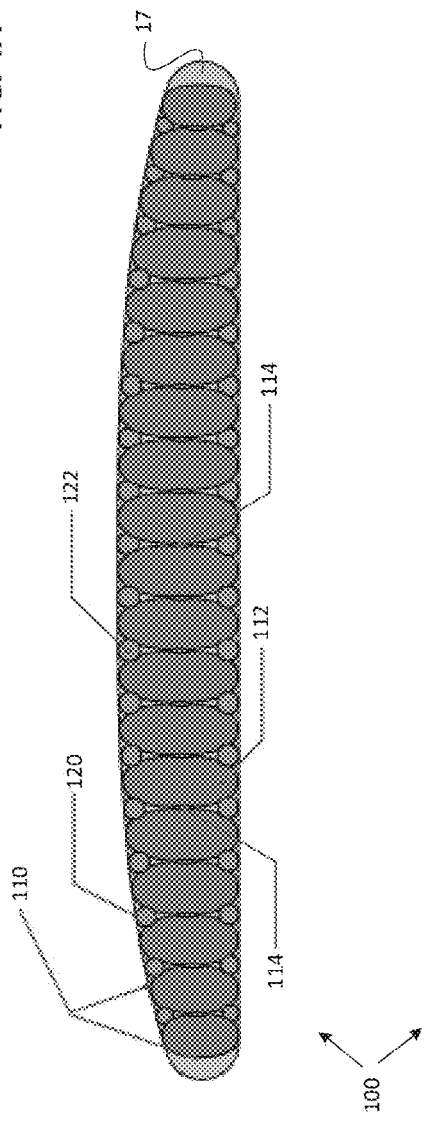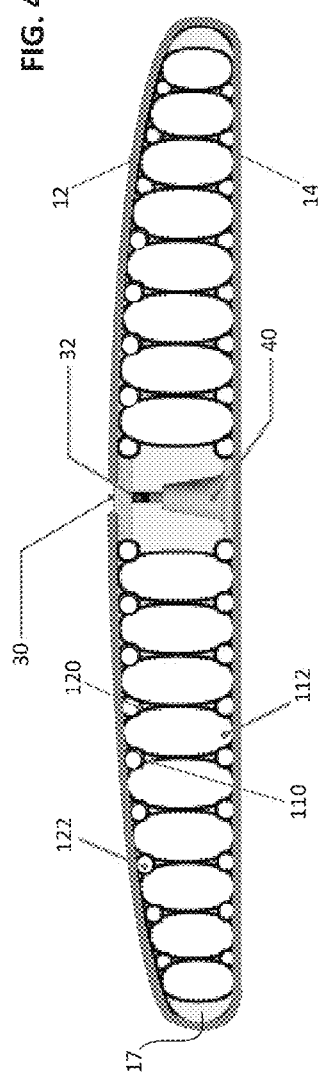

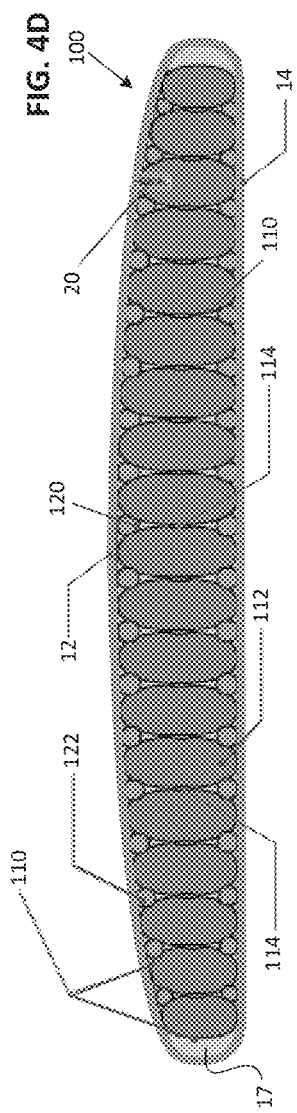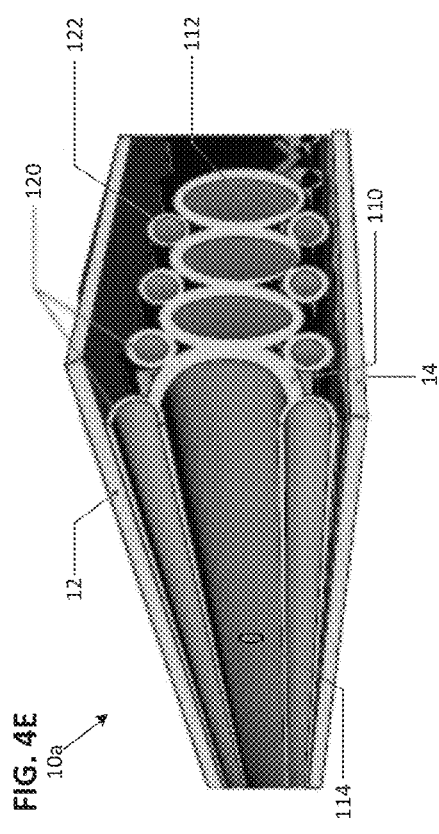

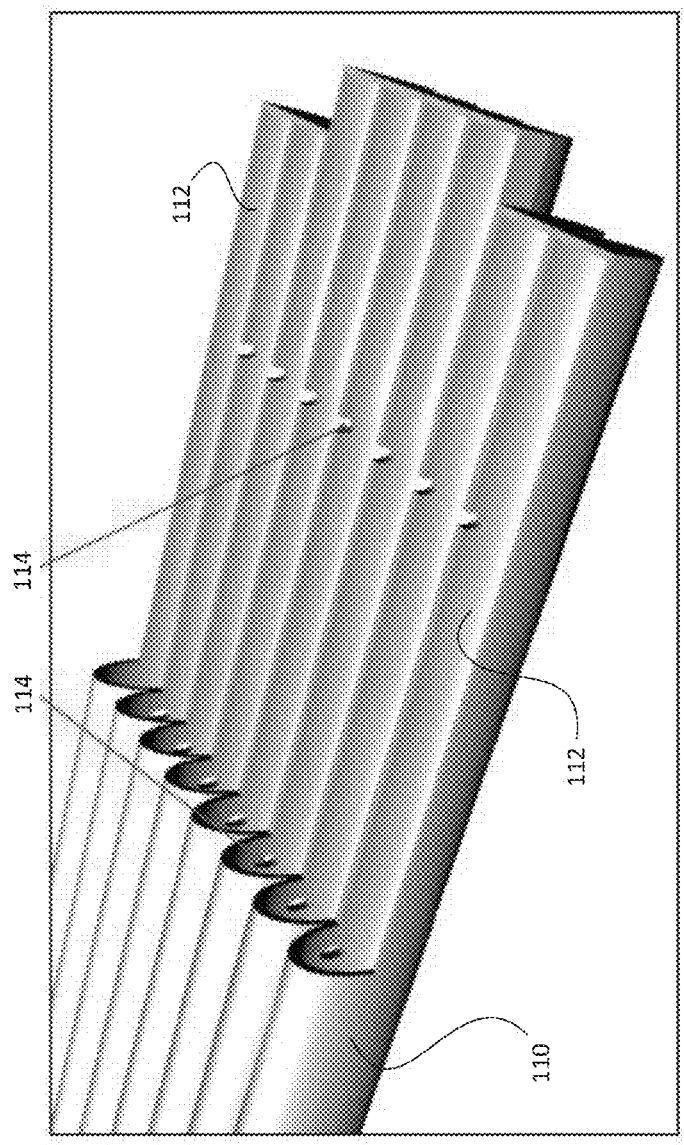

WATER SPORTS BOARDS HAVING PRESSURIZABLE / INFLATABLE BAFFLE CHAMBER STRUCTURES THEREIN, WHICH ARE MANUFACTURABLE BY WAY OF 3D PRINTING

TECHNICAL FIELD

The present disclosure relates generally to water sports board structures, and more particularly, to surfboards and/or other water sports board structures (e.g., body boards, kite surfing boards, and/or wind surfing boards) having pressurizable/inflatable baffle chamber structures and/or concavity adjustment elements therein, and water sports board structures that are manufacturable by way of 3D printing.

BACKGROUND

Various low or medium performance surfboards or similar types of boards exist which are inflatable, where such boards can be rolled up when deflated, for instance, for easy and compact transport. However, such boards fail to provide high performance, high maneuverability, and high responsiveness associated with conventional or traditional high performance board designs. For instance, ULI Boards (ULI Corp., San Diego, Calif. USA) offers a number of such inflatable surfboards and stand up paddle boards. With respect to higher or high performance surfboard designs, a number of Hydroflex surfboards (Hyderoflex Technology LLC, Oceanside, Calif. USA) are produced using a specially formulated resin and an open cell foam that can be pressurized up to approximately 9 psi. Such pressurization enables a certain degree of customization of surfboard stiffness or flex properties. Unfortunately, the available pressurization range is undesirably limited, resulting in an undesirably limited ability to customize surfboard properties based upon a wide range of rider preferences and/or surf conditions. Additionally, current higher/high performance surfboard designs are typically manufactured using toxic resins and non-recyclable materials, which do not lend themselves to the manufacture of essentially an entire surfboard by way of additive manufacturing or 3D printing.

Made Boards (Made LLC, Chicago, Ill. USA) produces windsurfing boards that are partially manufactured by way of 3D printing. Such windsurfing boards include an internal thermoplastic lattice that is reinforced with a bamboo underlayer and a fiberglass shell. However, such windsurfing boards are not manufactured essentially entirely by way of 3D printing, and after manufacture, any given windsurfing board of this type offers undesirably limited customizability. Moreover, such windsurfing boards are not pressurizable/inflatable for customizing performance characteristics.

A need exists for a surfboard design that offers riders significantly or greatly enhanced ability to customize surfboard performance characteristics, and the ability to produce essentially the entire surfboard by way of 3D printing using non-toxic and recyclable materials.

SUMMARY

In accordance with an aspect of the present disclosure, a water sports board having an outer surface and a length between a tip and a tail of the water sports board includes a top deck forming portions of the outer surface of the water sports board; a bottom deck forming portions of the outer surface of the water sports board; a set of baffle chamber structures disposed internal to the water sports board between the top deck and the bottom deck, each baffle chamber structure including a plurality of pressurizable/inflatable baffle elements therein having hollow elongate internal passages that are fluidically coupled to one another; and a set of inflation/deflation valves fluidically coupled to the set of baffle chamber structures, wherein each inflation/deflation valve is accessible from the outer surface of the water sports board, wherein the top deck overlays the set of baffle chamber structures and the bottom deck underlies the set of baffle chamber structures. Each of the plurality of baffle elements extends in a lengthwise or generally lengthwise direction along portions of the length of the water sports board. The top deck, the bottom deck, and the set of baffle chamber structures can be made of recyclable materials and can be manufacturable by way of 3D printing, such as a single 3D printing procedure. The water sports board typically further includes left and right side rails between which the set of baffle chamber structures resides. Such side rails can also be manufacturable by 3D printing, such as the aforementioned single 3D printing procedure.

The set of baffle chamber structures can include a plurality of baffle chamber structures, each of which is disposed at a predetermined position along the length of the water sports board, and each of which is fluidically isolated from another of the baffle chamber structures. Each of the baffle chamber structures is pressurizable/inflatable to provide a section of the water sports board in which the baffle chamber structure resides with an intended level of stiffness or flex. At least one baffle chamber structure within the set of baffle chamber structures is pressurizable up to approximately 50 psi.

The water sports board can further include a concavity adjustment mechanism carried thereby, by which concavity of the bottom deck of the water sports board is adjustable. The concavity adjustment mechanism can include a concavity adjustment screw accessible from the top deck of the water sports board. The concavity adjustment screw is typically configured for threaded engagement with a concavity adjustment nut, plate, cup, and/or socket structure that is coupled to and which extends away from the bottom deck in a direction towards the top deck.

The water sports board can also include a dividing structure that fluidically isolates each baffle chamber structure from another baffle chamber structure. The dividing structure can be a generally V-shaped, U-shaped, or C-shaped structure that extends at a predetermined angle away from a center line of the water sports board, on each of a left side and a right side of the center line. The dividing structure typically includes or is formed as a plurality of dividing elements, each of which is at least partially disposed or formed internal to a baffle element (e.g., each dividing element can be formed entirely internal to a baffle element). In various embodiments, the dividing structure is also formed by way of 3D printing (e.g., as part of a single 3D printing procedure in which the water sports board's bottom deck, side rails, baffle chamber structures, dividing structure, and top deck are formed, such as from recyclable materials).

In accordance with an aspect of the present disclosure, a process for manufacturing a water sports board having a structure set forth above includes manufacturing each of the top deck, the underside, and the set of baffle chamber structures by way of 3D printing using recyclable materials. Manufacturing each of the top deck, the underside, and the set of baffle chamber structures by way of 3D printing can occur as part of a single 3D printing procedure. Manufacturing the water sports board can also include providing a concavity adjustment mechanism carried by the water sports board, by which concavity of the bottom deck is adjustable.

BRIEF DESCRIPTION OF THE DRAWINGS

FIG. 1 is a perspective view of a representative first surfboard manufacturable by way of 3D printing, which internally carries a plurality of pressurizable/inflatable baffle chambers and a concavity adjustment mechanism in accordance with an embodiment of the present disclosure.

FIGS. 3A-3C provide perspective views illustrating a representative manner in which first and second pressurizable/inflatable segmented baffle chambers are oriented relative to each other within the surfboard of FIG. 1.

FIG. 4A is a cross sectional illustration of a representative baffle chamber structure within a surfboard in accordance with an embodiment of the present disclosure.

FIG. 4B is a cross sectional illustration of a representative baffle chamber structure and a representative concavity adjustment mechanism within a surfboard in accordance with an embodiment of the present disclosure.

FIG. 4D is a cross sectional illustration of a representative baffle chamber structure and a representative pressurization/inflation valve disposed therein for a surfboard in accordance with an embodiment of the present disclosure.

FIG. 4E shows a first perspective cutaway view illustrating portions of a baffle chamber structure within a surfboard in accordance with an embodiment of the present disclosure.

FIG. 4F shows a second perspective cutaway view illustrating portions of a baffle chamber structure for a surfboard in accordance with an embodiment of the present disclosure.

DETAILED DESCRIPTION

Figure 2A:
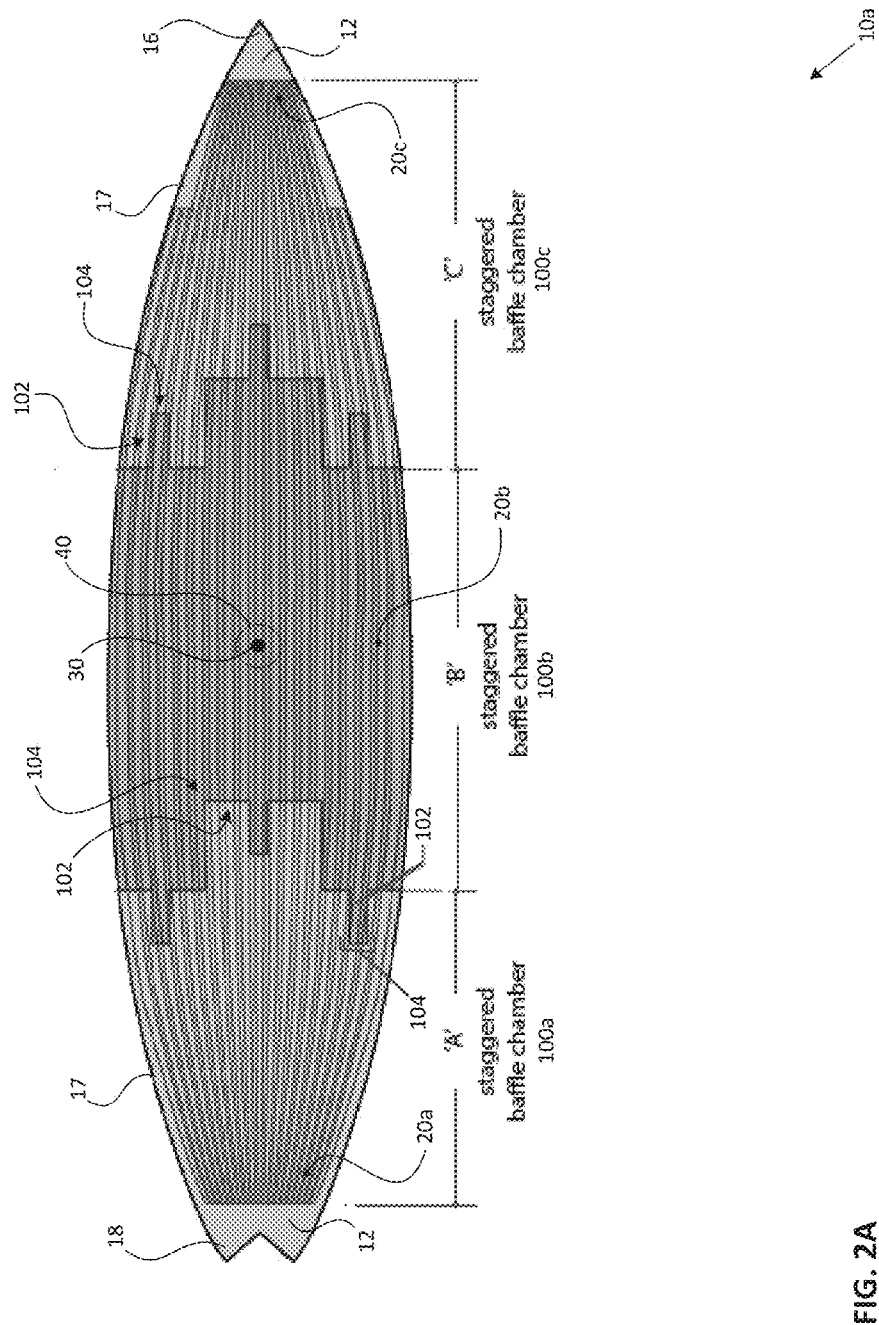
FIG. 2A is a top internal view of the surfboard of FIG. 1, illustrating aspects of representative first, second, and third pressurizable/inflatable segmented baffle chambers carried therein.

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. Herein, the recitation of a particular numerical value or value range, or the use of the term "approximately" or "about" relative to a numerical value or value range, is understood to include or be a recitation of an approximate numerical value or value range (e.g., within +/−1% to +/−10%, 15%, or 20%).

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration.

Embodiments in accordance with the present disclosure are directed to water sports boards that include at least one, and typically multiple, fluidically (e.g., air) pressurizable/inflatable baffle chamber structures, and which can further include at least one concavity adjustment element or mechanism, therein. Such water sports boards include at least surfboards, body boards/boogie boards, kite surfing boards, and wind surfing boards. For purpose of brevity and to aid understanding, the description that follows is directed to surfboard structures; however, the concepts presented herein are equally applicable to other types of water sports board structures, as will be readily appreciated by one having ordinary skill in the relevant art. Hence, remarks made herein with regard to surfboards can apply analogously to other types of water sports board structures.

Embodiments in accordance with the present disclosure are at least partially manufacturable by way of additive manufacturing or 3D printing, and various embodiments are entirely or essentially entirely manufacturable by way of 3D printing, as further detailed below.

FIG. 1 is a perspective view showing a representative water sports board such as a surfboard 10a (e.g., a first surfboard) manufacturable by way of 3D printing, which internally carries a set of pressurizable/inflatable baffle chamber structures 100a-c and which also includes a concavity adjustment mechanism 30, 40 in accordance with an embodiment (e.g., a second embodiment) of the present disclosure. FIGS. 2A-5 illustrate particular aspects of the first surfboard 10a of FIG. 1, and surfboard embodiments that are analogous or related thereto.

Figure 4C:
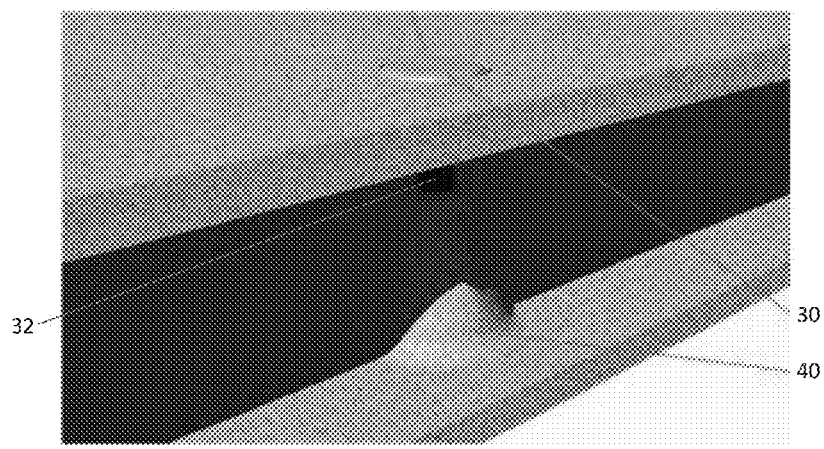
FIG. 4C is a cross sectional illustration showing internal portions of a surfboard that includes a nut, plate, cup, and/or socket structure integrally formed in an upper inner surface of the surfboard's bottom deck, which is engageable with a concavity adjustment screw that is accessible from the surfboard's top deck in accordance with an embodiment of the present disclosure.

A surfboard 10a manufactured in accordance with embodiments of the present disclosure includes at least one type of outer or exterior surface or deck material for providing a top or upper deck 12 for supporting a surfer's body and/or feet; a bottom deck or underside 14 (portions of which are illustrated in FIGS. 4B-4D) that contacts or rides on the surface of a wave when the surfboard is ridden; a tip or tip/nose section 16; a tail or tail section 18; and side rails 17 that extend along the left and right peripheral borders of the surfboard 10a between its tip 16 and tail 18, in a manner readily understood by one having ordinary skill in the relevant art.

FIG. 2A is a top internal or partial cutaway view of the surfboard 10a of FIG. 1, illustrating aspects of representative pressurizable/inflatable and typically depressurizable/deflatable segmented baffle chamber structures 100a-c carried therein in accordance with an embodiment of the present disclosure. For purpose of brevity and clarity, the term pressurizable/inflatable as used hereafter refers to embodiments that are also depressurizable/deflatable. Surfboards 10 in accordance with embodiments of the present disclosure include at least one, and typically multiple, pressurizable/inflatable baffle chamber structures 100a-c therein. Each baffle chamber structure 100a-c facilitates the maintenance of and contributes to the surfboard's structural integrity. In embodiments that include multiple baffle chamber structures 100, each baffle chamber structure 100 is configured for adjacent positioning relative to and/or structural engagement with a neighboring baffle structure 100a-c along the length of the surfboard 10a. In several embodiments, adjacent baffle chamber structures 100a-b, 100b-c are configured for mating engagement each other. More particularly, in some embodiments, a given baffle chamber structure 100 includes staggered segments such as projections or protruding portions 102 and/or gaps, slots, or recessed portions 104 configured for mating engagement with gaps 104 and/or projections 102, respectively, corresponding to or formed in an adjacent baffle chamber structure 100, such that adjacent baffle chamber structures 100a-b, 100b-c interleave, interlace, and/or interlock. For instance, as illustrated in FIG. 2A, a first baffle chamber structure 100a corresponding to a rear/tail section of the surfboard 10a is configured for mating engagement with a second baffle chamber structure 100b corresponding to a mid-section of the surfboard 10a by way of projections 102 and gaps 104 that fit together or matingly engage. Similarly, the second baffle chamber structure 100b is configured for mating engagement with a third baffle chamber structure 100c corresponding to a forward/tip section of the surfboard 10a by way of projections 102 and gaps 104 that fit together or matingly engage. Thus, in such an embodiment, the length of each baffle chamber structure 100 varies across its width due to the presence of one or more projections 102 and one or more gaps 104 which facilitate or enable structural engagement relative to an adjacent baffle compartment structure's gaps 104 and projections 102, respectively.

Each baffle chamber structure 100a-c is selectively or selectably pressurizable or inflatable (and correspondingly depressurizable or deflatable) by way of an inflation/deflation valve 20a-c (for instance, a conventional type of pneumatic inflation/deflation valve, e.g., rubber ball value configured for receiving a needle, such as a Tachikara replaceable rubber ball valve (Tachikara Inc./Tachikara Holdings Limited Japan, www.tachikara.com) or similar type of valve) that is exposed to or accessible from a portion of the surfboard's outer surface (e.g., the top deck 12, the bottom deck 14, or a side rail 17). As a result, any given baffle chamber structure 100a-c can be pressurized or inflated to provide a given section or segment of the surfboard 10a in which the baffle chamber structure 100 resides with an intended or desired level of stiffness or flex, such that the surfboard's stiffness or flex characteristics or the stiffness/flex profile along the surfboard's length can be customized or adjusted in accordance with surf conditions and/or surfer preference.

In the embodiment shown, the surfboard 10a includes a first, a second, and a third baffle chamber structure 100a-c. However, other surfboards 10 in accordance with embodiments of the present disclosure can include fewer or additional baffle chamber structures 100 therein (e.g., two, four, five, or more baffle chamber structures 100), depending upon embodiment details. Additionally, in the embodiment shown, each individual baffle chamber structure 100a-c is inflatable by way of a corresponding individual valve 20a-c. Notwithstanding, in alternate embodiments, a single valve 20 can pressurize/inflate more than one baffle chamber structure 100 (e.g., a single valve 20 can pressurize/inflate two adjacent baffle chamber structures 100, or multiple baffle chamber structures 100 that are separated or segregated from each other by one or more intervening baffle chamber structures 100).

In some embodiments, the surfboard 10a also includes a concavity adjustment mechanism by which the concavity of the surfboard's bottom deck or underside 14 can be adjusted or altered. In the embodiment shown, the concavity adjustment mechanism includes a concavity adjustment screw 30, which is configured for mating engagement with a concavity adjustment nut, plate, or socket structure 40 that is structurally coupled or connected to an upper internal side of the surfboard's bottom deck 14. As further described below, rotation of the concavity adjustment screw 30 draws portions of the surfboard's bottom deck 14 positioned below the concavity adjustment screw 30 toward the surfboard's top deck 12, thereby altering or modifying the concavity of the surfboard's bottom deck 14. Consequently, the surfboard's concavity can be customized or tailored based upon surf conditions and/or surfer preference.

As will be readily understood by one having ordinary skill in the art, the surfboard 10a also typically includes fins (not shown), which can be mounted (e.g., removably mounted) to a tail region or section of the surfboard by way of fasteners such as screws. The surfboard 10a can also include a leg leash mount, cup, or plug (not shown) formed in or attached/attachable to the surfboard's top deck 12, for securely retaining a leg leash or cord that is worn by the surfer, as will also be readily understood by one having ordinary skill in the relevant art.

Figure 2B:
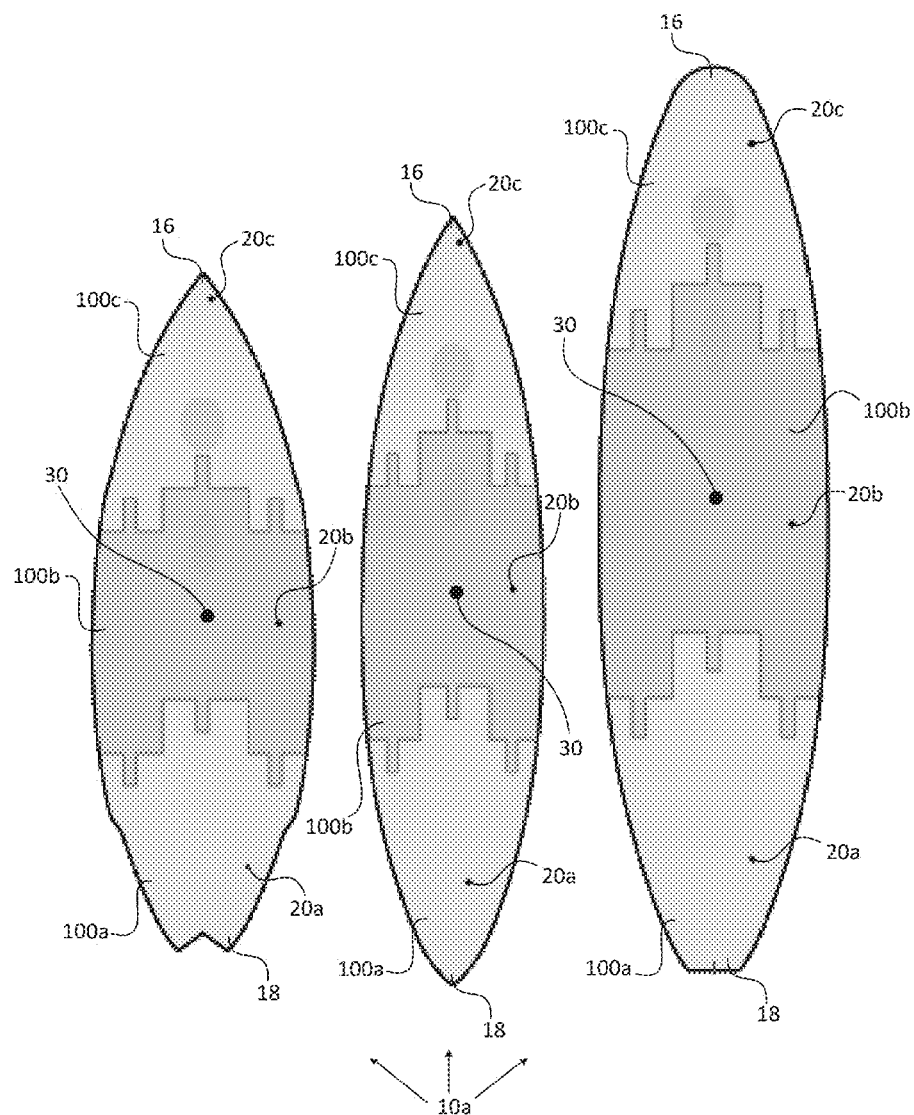
FIG. 2B is a top internal view showing representative designs for surfboards that include internal pressurizable/inflatable baffle chambers in accordance with several embodiments of the present disclosure.

Surfboards 10 in accordance with embodiments of the disclosure can exhibit essentially any type of shape and/or design suitable for surfing waves, for instance, longboard, mini-longboard, shortboard, funboard, retro-fish, or other (e.g., hybrid) designs. FIG. 2B provides top internal views showing a small sample of representative designs for surfboards 10a-c that include internal pressurizable/inflatable baffle chamber structures 100a-c in accordance with embodiments of the present disclosure.

FIGS. 3A-3C provide perspective views illustrating a representative manner in which first and second pressurizable/inflatable segmented baffle chamber structures 100a,b are oriented relative to and engaged with each other within the surfboard 10a of FIG. 1. As indicated in FIG. 3A, each baffle chamber structure 100a-b includes a plurality of individual baffles or baffle elements 110 across the baffle chamber structure's width. Each individual baffle element 110 forms a hollow or substantially hollow elongate tube, chamber, passage, or channel, which is pressurizable/inflatable to at least some degree, such that its compressibility can be adjusted or varied. The collection of baffle elements 110 that form a given baffle chamber structure 100a,b provide a predetermined section of the surfboard 10a to which the baffle chamber structure 100a,b corresponds with a given range of flexural and torsional strength, for instance, based upon the extent to which the baffle chamber structure 100a,b is pressurized or inflated. Further aspects of baffle chamber pressurization/inflation are described in detail below.

In various embodiments, a given baffle chamber structure 100a-b includes baffle elements 110 of different lengths (i.e., shorter and longer baffle elements 100), such that the baffle chamber structure's length is staggered across its width. For a particular baffle chamber structure 100, baffle chamber structure sections or segments that correspond to longer baffle elements 100 which extend beyond shorter baffle elements 100 form a baffle chamber protrusion 102, which is intended to fit into or matingly engage with a baffle chamber gap 104 corresponding to shorter baffle elements 100 disposed between longer baffle elements 100 of an adjacent baffle chamber structure 100. Similarly, for a baffle chamber structure 100 under consideration, baffle chamber structure sections that correspond to shorter baffle elements 100 disposed between longer baffle elements 100 form a baffle chamber gap 104 that is intended to receive or matingly engage with a baffle chamber protrusion 102 formed from longer baffle elements 110 disposed between shorter baffle elements 110 of an adjacent baffle chamber structure 100.

As shown in FIG. 3B, the protrusions 102 of a given baffle chamber structure 100a,b closely or snugly fit into the gaps 104 of a counterpart baffle chamber structure 100b,a, and vice versa, in order to enhance the surfboard's structural integrity. As indicated in FIG. 3C, the baffle chamber structures 100a,b are surrounded, overlaid, or encapsulated with one or more materials that form the surfboard's exterior, that is, the surfboard's top and bottom deck 12, 14 and outer rails 17, such that the surfboard 10a has a smooth and seamless visual appearance.

As further described hereafter, one or more portions of the surfboard 10a can include additional internal structures for purpose of enhancing the surfboard's strength or structural integrity. FIG. 4A is a cross sectional illustration of a representative baffle chamber structure 100 within a surfboard 10a in accordance with an embodiment of the present disclosure, which includes a plurality of baffle elements 110 laterally disposed across the baffle chamber structure's width. As indicated in FIG. 4A, each baffle element 110 includes a hollow interior or internal chamber 112 that is pressurizable/inflatable and correspondingly depressurizable/deflatable. In several embodiments, each baffle element 110 has an elliptical cross sectional profile. However, in other embodiments, one or more baffle elements 110 can exhibit a circular or other type of cross sectional profile (e.g., a hexagonal profile). Additionally, while the embodiment shown includes a single layer of baffle elements 110 within a given baffle chamber structure 100, in certain embodiments a baffle chamber structure 100 can include multiple layers of baffle elements 110.

In addition to baffle elements 110, the surfboard 10a can include stringers or stringer structures 120 that extend lengthwise along the surfboard 10a. Each stringer 120 is typically disposed between two adjacent baffle elements 110, in a depression, indentation, crease, or crevice corresponding to upper or lower baffle element borders between adjacent baffle elements 110. Depending upon embodiment details, some or all of the stringers 120 can extend lengthwise along the entire or substantially the entire length of the surfboard 10a; or some or all stringers 120 can extend lengthwise along the entire or substantially the entire length of one or more baffle chamber structures 100, but not the entire or substantially the entire length of the surfboard 10a. Thus, some or all of the stringers 120 can extend lengthwise across each baffle chamber structure 120 to run fully or partially along the length of the surfboard 10a. In several embodiments, at least some of the stringers 120 are formed as hollow tubes or shafts, for instance, having an elliptical or circular cross sectional profile, such that these stringers 120 have a hollow interior or internal passage 122 therein. In alternate embodiments, at least some stringers 120 can have a semi-elliptical, semi-circular, or other type of cross section, whereby such stringers 120 need not form completely closed passages or structures.

FIG. 4B is a cross sectional illustration of a representative baffle chamber structure 100 and a representative concavity adjustment mechanism 30, 40 within a surfboard 10a in accordance with an embodiment of the present disclosure. As indicated in FIG. 4B, the concavity adjustment mechanism 30, 40 includes the concavity adjustment screw 30, which has a threaded shaft 32 configured for engaging with a threaded nut, plate, cup, and/or socket structure 40 that is coupled or connected to or formed in an upper inner surface of the surfboard's bottom deck 14. FIG. 4C is a cross sectional illustration showing internal portions of a surfboard 10a that includes a cup or socket structure 40 integrally formed in an upper inner surface of the surfboard's bottom deck 14, which is engageable with a concavity adjustment screw 30 that is accessible from the surfboard's top deck 12 in accordance with an embodiment of the present disclosure.

In several embodiments, the cup or socket structure 40 with which the concavity adjustment screw's shaft 32 engages or is engageable is integrally formed in and upwardly extends away from an upper inner surface of the surfboard's bottom deck 14, such that the cup or socket structure 40 resides internal to the surfboard 10a between the top deck 12 and the bottom deck 14. As the concavity adjustment screw 30 is turned in a given direction (e.g., clockwise or counterclockwise), engagement of the concavity adjustment screw's shaft 32 with the threaded cup or socket structure 40 selectively or selectably draws the cup or socket structure 40 toward the surfboard's top deck 12 to thereby increase the concavity of the surfboard's bottom deck 14, or displaces the cup or socket structure 40 away from the surfboard's top deck 12 to thereby decrease the concavity of the bottom deck 14, in a manner that will be understood by one having ordinary skill in the relevant art. In several embodiments, the cup or socket structure 40 can be positioned in a middle region of the surfboard 10a, for instance, in a manner indicated in FIGS. 1-2B. Portions of a centrally disposed baffle chamber structure 100b can be formed in a manner that surrounds the cup or socket structure 40 (e.g., in a fluidically isolated open region or gap within the centrally disposed baffle chamber structure 100b).

FIG. 4D is a cross sectional illustration of a representative baffle chamber structure 100 and a representative pressurization/inflation valve 20 disposed therein for a surfboard 10a in accordance with an embodiment of the present disclosure. In the embodiment shown, the pressurization/ inflation valve 20 is positioned such that it extends into at least one of the baffle elements 110 within a given baffle chamber structure 100, such that the pressurization/inflation valve can selectively deliver pressurized air into at least one baffle element 110. As further detailed hereafter, individual baffle elements 110 within a given baffle chamber structure 100 are configured for fluid (e.g., air) communication with each other, to facilitate uniform pressurization/inflation (and correspondingly, uniform depressurization/deflation) of the entire baffle chamber structure 110.

With further reference to FIGS. 4E and 4F, FIG. 4E shows a first perspective cutaway view illustrating portions of a baffle chamber structure 100 within a surfboard 10a; and FIG. 4F shows a second perspective cutaway view illustrating portions of a baffle chamber structure 100 for a surfboard 10a in accordance with an embodiment of the present disclosure. As indicated in FIGS. 4D, 4E, and 4F, within a given baffle chamber structure 100, individual baffle chamber elements are fluidically coupled to one another, such that pressurized air introduced into a given baffle element 110 can flow into and/or across other baffle elements 110 within the baffle chamber structure 100. More particularly, in several embodiments, adjacent baffle elements 110 are fluidically coupled to one another by way of apertures, openings, or passages 114 therein/therebetween, which form passages by which air can flow (e.g., laterally) from one baffle element 110 to another baffle element 110 within the baffle chamber structure 100. Such apertures 114 can have a predetermined distribution relative to the length of the baffle elements 110 (e.g., each baffle element 110 can include at least one, and typically two, three, or more of such apertures 114 along its length).

Figure 5:
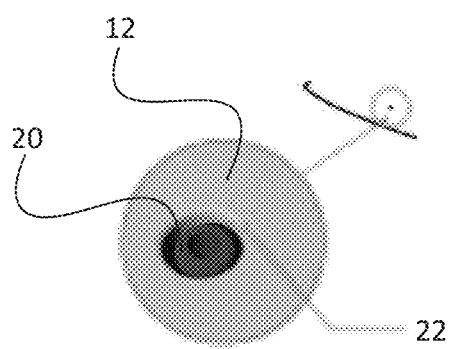
FIG. 5 is a perspective view of a representative pressurization/inflation valve carried by the top deck of the surfboard of FIG. 1 in accordance with an embodiment of the present disclosure.

FIG. 5 is a top perspective view of a representative pressurization/inflation valve 20 carried by the top deck 12 of the surfboard 10a of FIG. 1 in accordance with an embodiment of the present disclosure. As indicated in FIG. 5, in various embodiments the pressurization/inflation valve 20 is disposed in a recess 22 formed within the surfboard's top deck 12. In a number of embodiments, the pressurization/inflation valve 20 provides a standard type of pneumatic interface that can matingly engage with a bicycle pump or other type of conventional pressurization/inflation device. Depressurization/deflation can occur by way of pressing a central stem element internal to the valve 20, in a manner readily understood by one having ordinary skill in the relevant art.

In various embodiments, the surfboard's outer or exterior surface(s)/deck material(s) are manufacturable by way of 3D printing. Such deck material(s) can include or be made from one or more types of materials such as nylon, Polyethylene terephthalate, ABS, etc. . . . . . Deck materials can be formed of or as one or more generally rigid yet at least somewhat resiliently flexible materials. Additionally or alternatively, each baffle chamber structure 100 is manufacturable by way of 3D printing. Each baffle chamber structure 100 can include or be made from one or more types of materials, such as nylon, Polyethylene terephthalate, ABS, etc. . . . . . The surfboard's stringers 120 are also manufacturable by way of 3D printing, and can include or be made from one or more types of materials such as nylon, Polyethylene terephthalate, ABS, etc. . . . . .

In multiple embodiments, at least each baffle chamber structure 100a-c as well as the surfboard's exterior or outer surfaces (i.e., the top and bottom deck 12, 14 and side rails 15) are manufacturable by way of 3D printing. In some embodiments, at least portions of the concavity adjustment mechanism 30, 40 are also manufacturable by way of 3D printing. Surfboard fins (not shown) can also be formed by way of 3D printing, as can a leg leash mount (not shown). Additionally, at least portions of each inflation valve 20a-c can be formed by way of 3D printing. Thus, essentially the entire surfboard 10a, or the entire surfboard 10a, is manufacturable by way of 3D printing (e.g., in a single 3D printing procedure, such as a single 3D printing procedure during which each of the top deck 12, the underside 14, the side rails 17, and the baffle chamber structures 100a-c are produced). As a result, the manufacture of surfboards 10 in accordance with embodiments of the present disclosure can substantially or entirely avoid the use of toxic chemical substances (e.g., toxic resins) and/or non-recyclable materials. Surfboards 10 manufactured in accordance with embodiments of the present disclosure are substantially entirely, or entirely, recyclable, without the need for disassembly and/or parts or material sorting.

In a representative implementation, the top deck 12 and the bottom deck 14 can each have a thickness of between 1-6 mm. Any given baffle element 110 can form an elliptical tubular structure having walls with a thickness of approximately 1-4 mm; a major (vertical) inner diameter of approximately 3-75 mm; and a minor (horizontal/lateral) inner diameter of approximately 3-75 mm. Any given stringer 120 can form a generally circular tubular structure having walls with a thickness of approximately 1-4 mm, and an inner diameter of approximately 3-75 mm. Each baffle chamber structure 100a,b,c can be selectively or selectably pressurized or inflated up to or more than a pressure of 50 psi.

FIGS. 6A-10 illustrate a representative surfboard 10b (e.g., a second surfboard) accordance with another embodiment (e.g., a second embodiment) of the present disclosure. In various embodiments, the second surfboard 10b carries a set of pressurizable/inflatable baffle chamber structures 100a-c that are pressurizable/inflatable (and typically depressurizable/deflatable) by way of a set of inflation/deflation valves 20a-c. Such a surfboard 10b can also include a concavity adjustment mechanism 30, 40. Furthermore, various embodiments of the second surfboard 10b are partially, essentially entirely, or entirely manufacturable by way of 3D printing. An individual having ordinary skill in the relevant art will recognize that the second surfboard 10b can exhibit dimensions (e.g., internal and/or external dimensions) and pressurizability characteristics/behaviors that are generally analogous, analogous, approximately equivalent, or essentially equivalent to those provided above for the first embodiment of the first surfboard 10a. Specific aspects of a representative embodiment of the second surfboard 10b are described in detail hereafter.

Figure 6A:
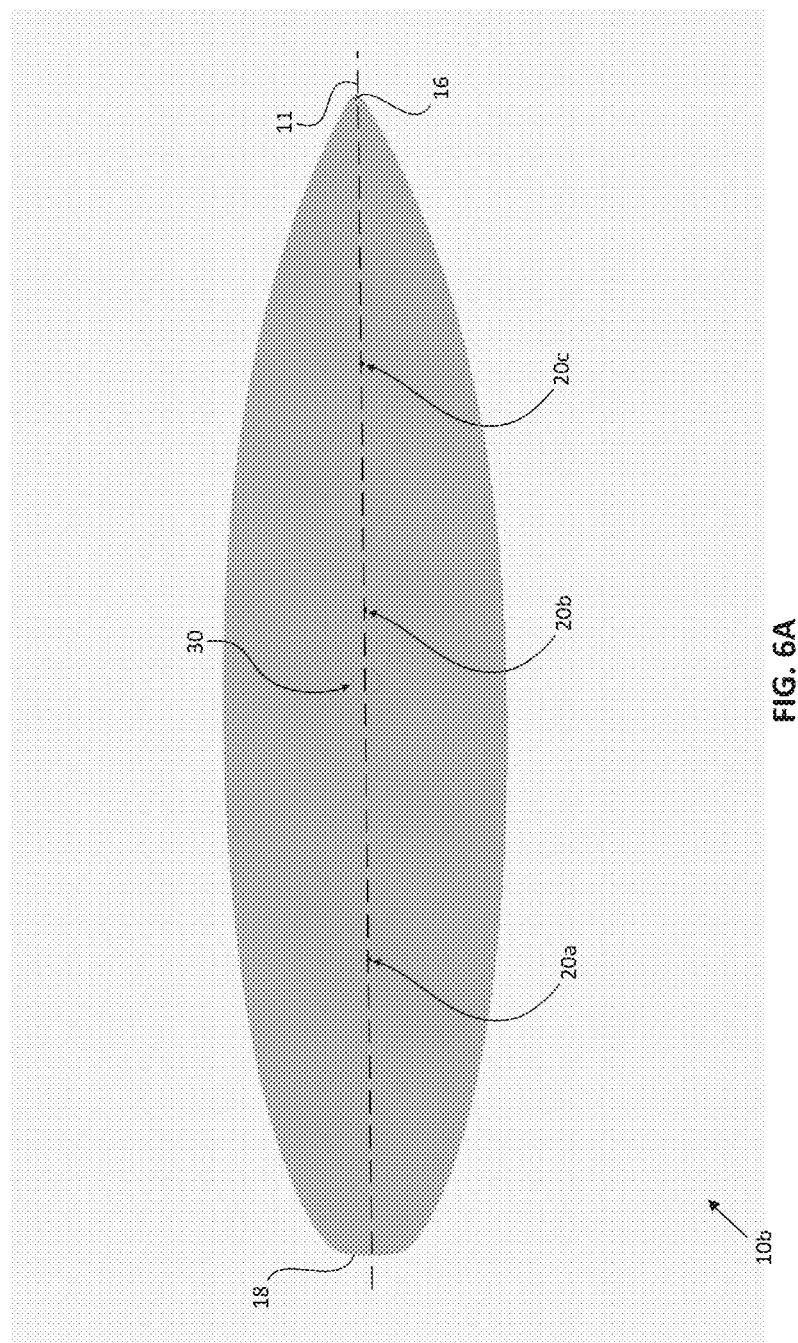
FIG. 6A is a top view and FIG. 6B is a profile or side view of a second surfboard in accordance with an embodiment of the present disclosure.
Figure 6B:
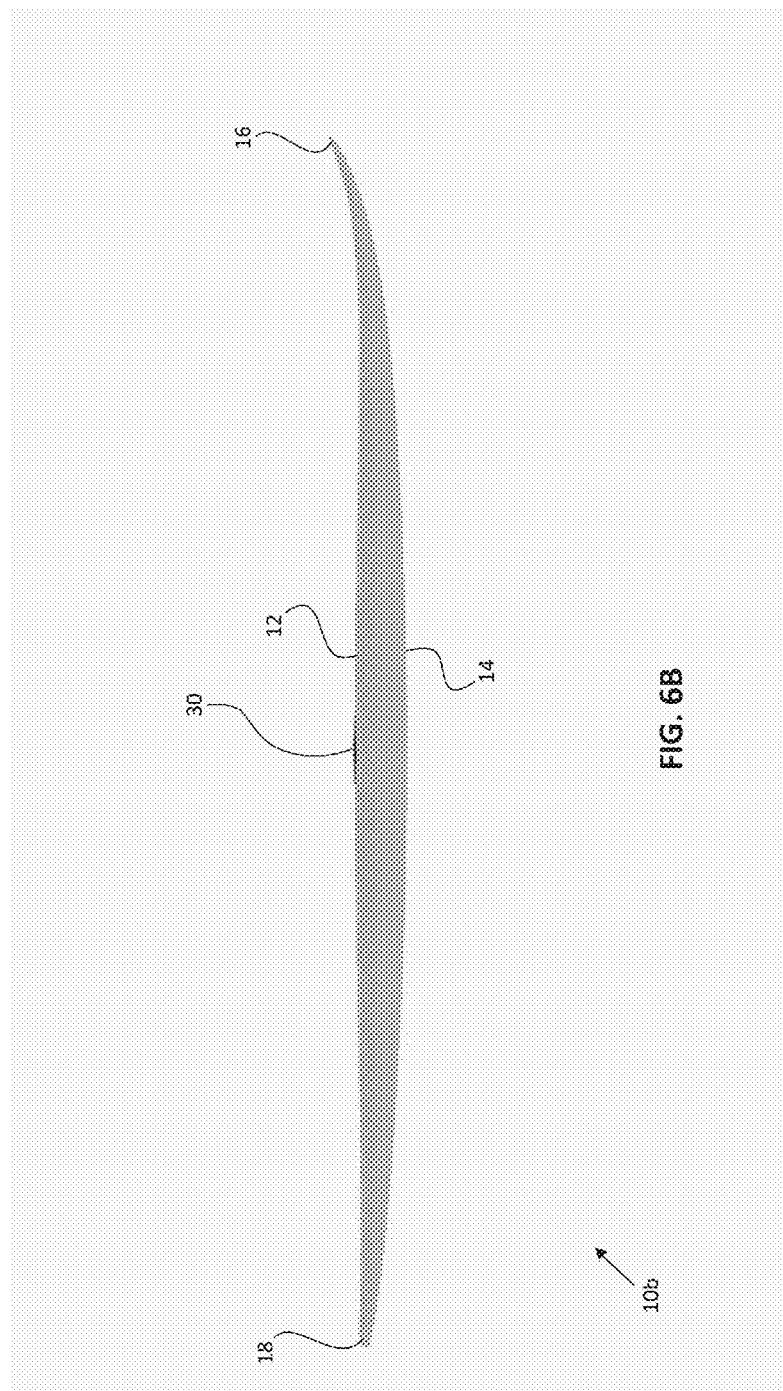
Figure 7A:
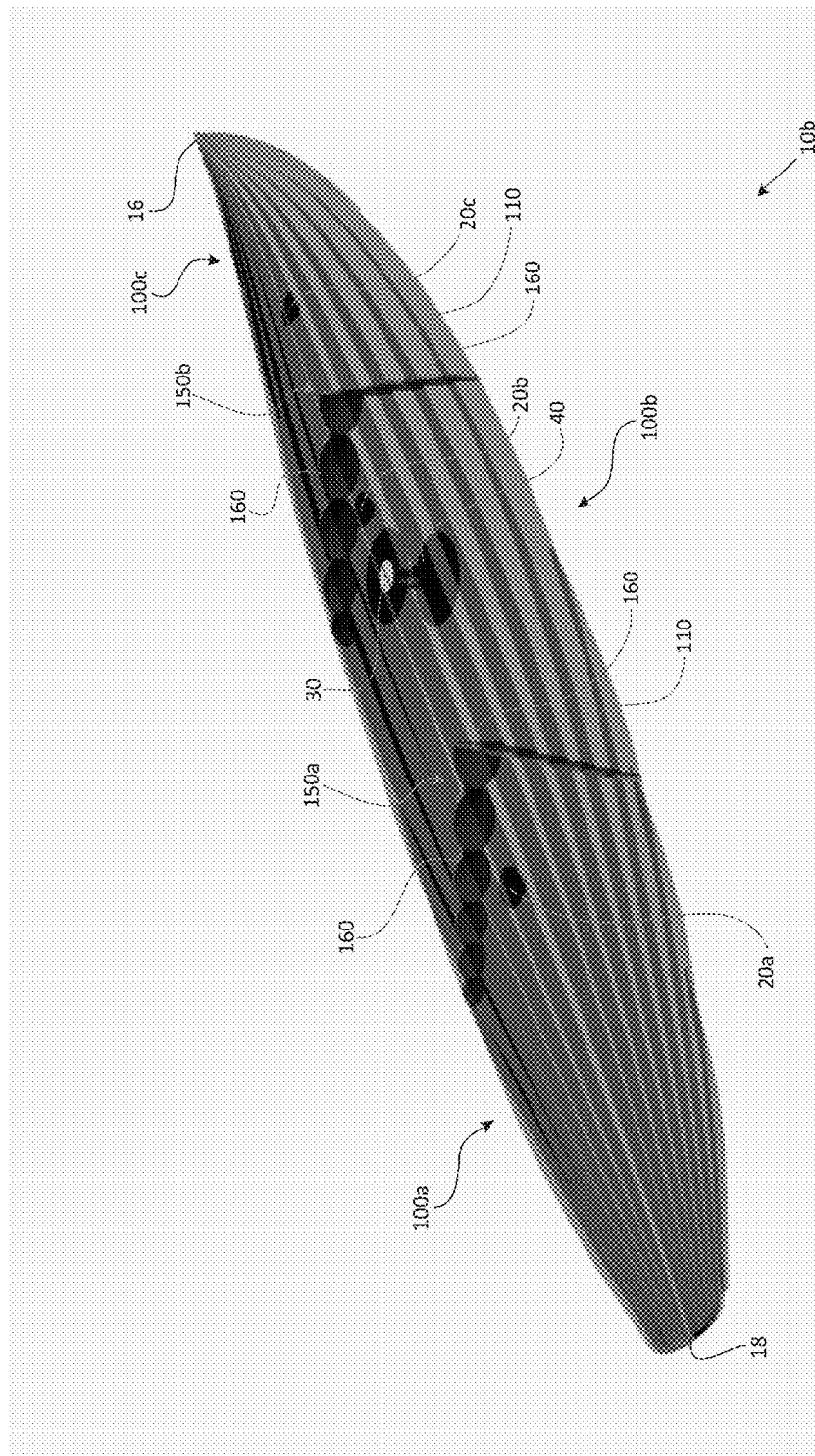
FIG. 7A is a perspective internal or partial cutaway view of the second surfboard in accordance with an embodiment of the present disclosure, indicating a representative internal arrangement of baffle chamber structures and baffle elements corresponding thereto, as well as dividing structures that define baffle chamber structures within the second surfboard.
Figure 7B:
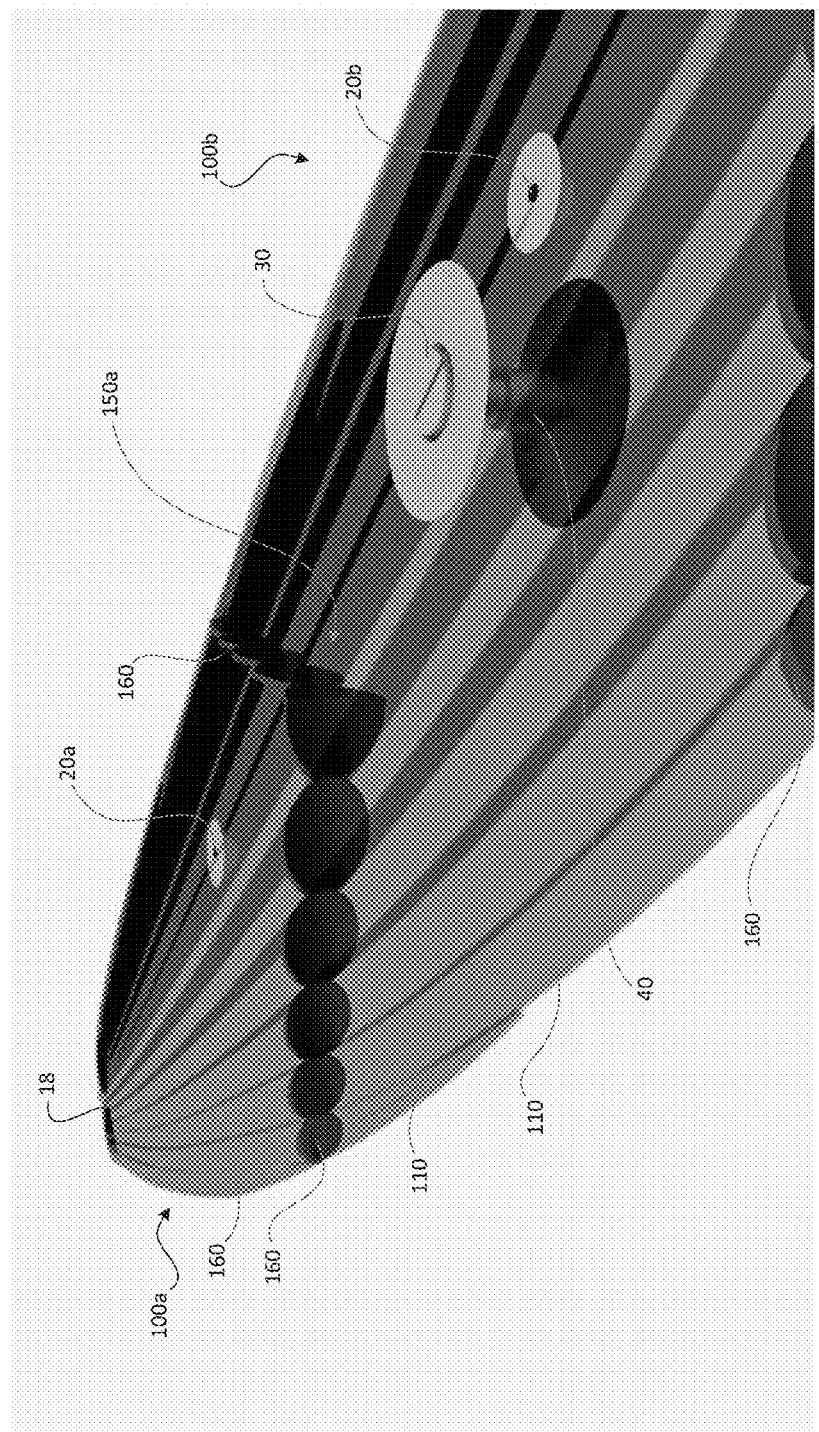
FIG. 7B is another perspective internal or partial cutaway view corresponding to FIG. 7A, showing internal portions of the second surfboard from a middle region to a tail thereof.
Figure 8A:
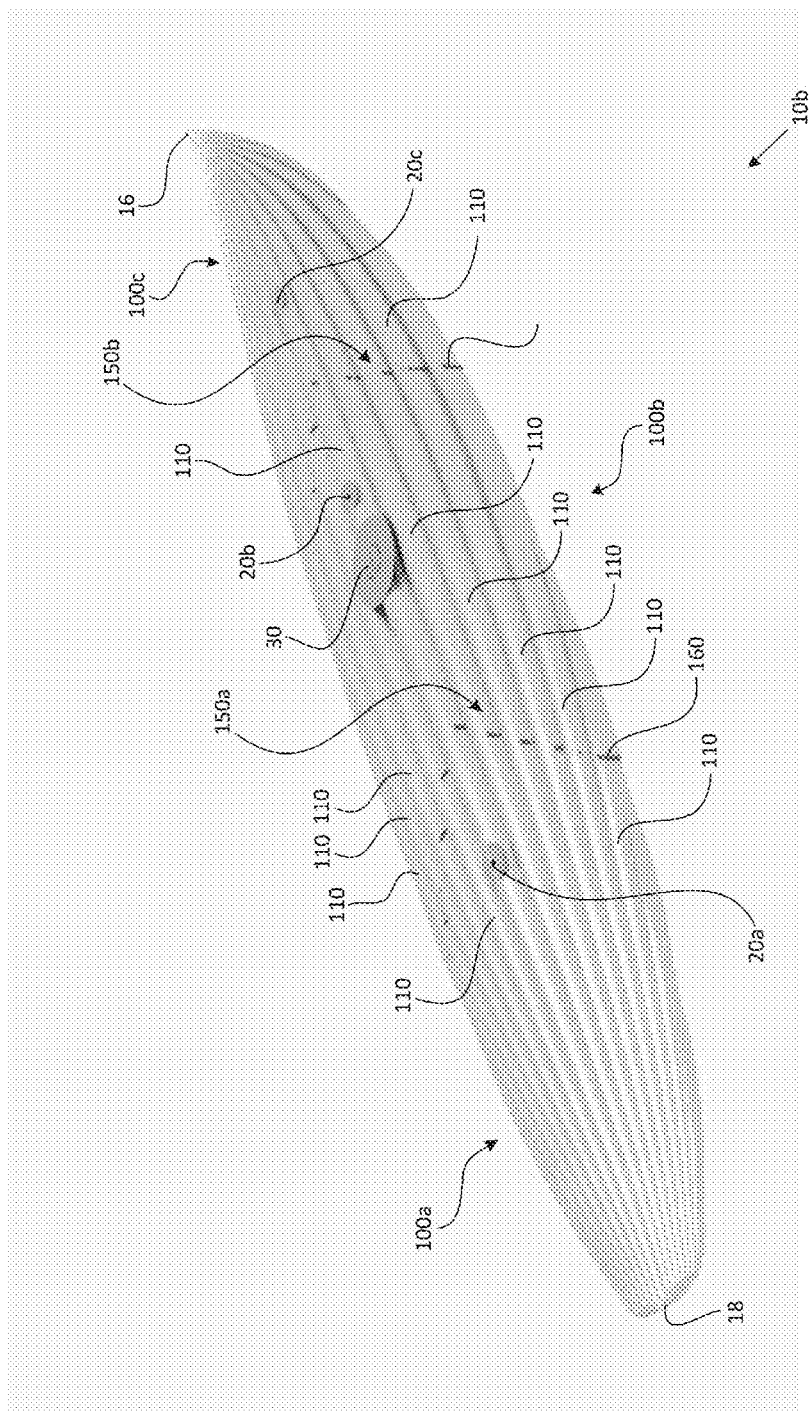
FIG. 8A is a perspective view of the second surfboard corresponding to FIG. 7A, illustrating a representative internal appearance of the second surfboard to an observer were a top deck thereof removed.
Figure 8B:
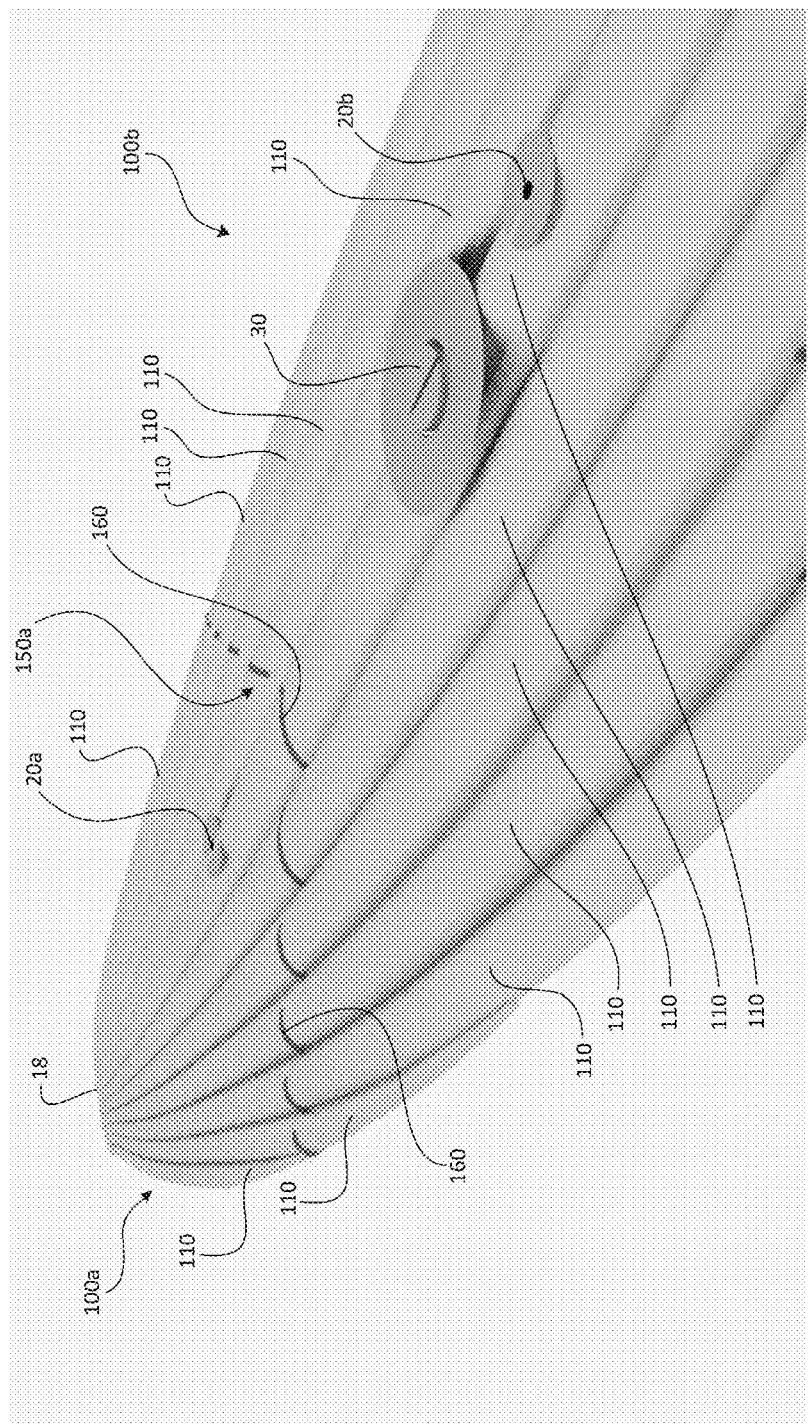
FIG. 8B is another top perspective view corresponding to FIG. 8A, from the middle region of the second surfboard to its tail.
Figure 9:
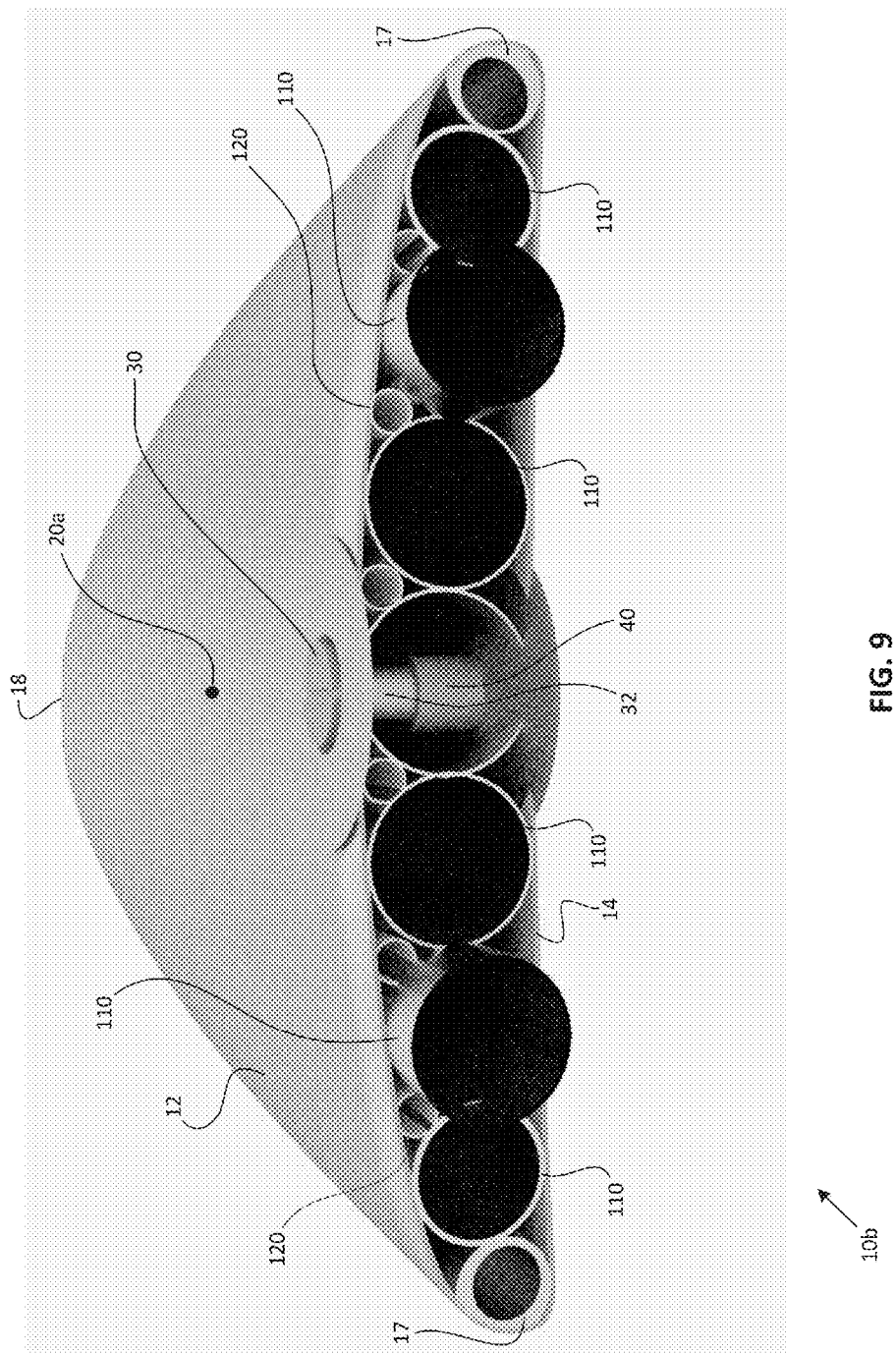
FIG. 9 is a cross sectional illustration of a portion of the second surfboard showing a representative arrangement of baffle elements, stringers, and a concavity adjustment mechanism accordance with an embodiment of the present disclosure.
Figure 10:
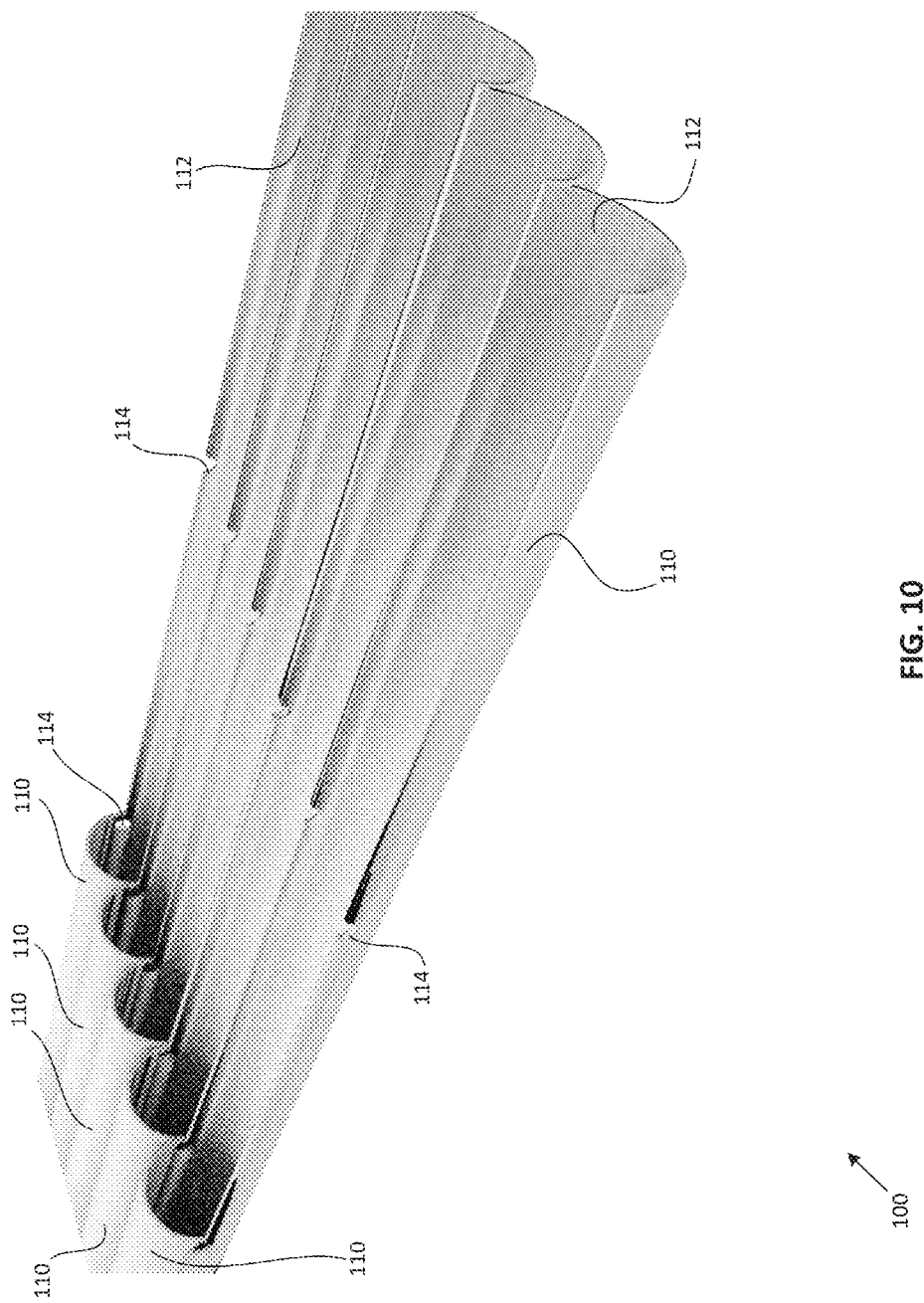
FIG. 10 is a perspective cutaway view illustrating portions of a baffle chamber structure for the second surfboard whereby individual baffle elements are fluidically coupled to one another by way of apertures in accordance with an embodiment of the present disclosure.

FIG. 6A is a top view and FIG. 6B is a profile or side view of the second surfboard 10b in accordance with an embodiment of the present disclosure. FIG. 7A is a perspective internal or partial cutaway view of the second surfboard 10 in accordance with an embodiment of the present disclosure, indicating a representative arrangement of baffle chamber structures 100a-c and baffle elements 110 corresponding thereto within the second surfboard 10b, as well as dividing structures 150a,b that separate and fluidically isolate individual baffle chamber structures 100a-c from each other (e.g., such that any given baffle structure 100a-c can be pressurized/inflated independent, essentially independent, or substantially independent of another baffle chamber structure 100a-c). FIG. 7B is another perspective internal or partial cutaway view corresponding to FIG. 7A, showing internal portions of the second surfboard 10b from a middle region of the second surfboard 10b to its tail 18. FIG. 8A is a perspective view of the second surfboard 10b corresponding to FIG. 7A, indicating (a) a representative internal appearance of the second surfboard 10b to an observer were the top deck 12 omitted or removed; (b) a representative arrangement of baffle elements 110 along the surfboard's length, and (c) by way of dashed lines, representative positions of dividing structures 150a,b that define boundaries between baffle chamber structures 100a-c. FIG. 8B is another top perspective view corresponding to FIG. 8A, considered the middle region of the second surfboard 10b to its tail 18. FIG. 9 is a cross sectional illustration of a portion of the second surfboard 10b showing a representative arrangement of baffle elements 110, stringers 120, and a concavity adjustment mechanism 30, 40 in accordance with an embodiment of the present disclosure. Finally, FIG. 10 is a perspective cutaway view illustrating portions of a baffle chamber structure 100 for the second surfboard 10b in accordance with an embodiment of the present disclosure, in which individual baffle elements 110 are fluidically coupled to one another by way of apertures 114 in a manner analogous or essentially identical to that described above.

As indicated in FIGS. 6A, 6B, and elsewhere, the second surfboard 10b can have an exterior structure and appearance that is somewhat analogous, generally analogous, analogous, approximately/substantially identical, or essentially identical to that for the first surfboard 10a shown in FIGS. 1 and 3C (e.g., depending upon embodiment details). Consequently, the surfboard 10b includes a top/upper deck; a bottom deck or underside 14; a tip/nose section 16; a tail section 18; and side rails 17, in a manner readily understood by an individual having ordinary skill in the relevant art. The second surfboard 10b further includes a set of inflation/deflation valves 20a-c, each of which is exposed to or accessible from a portion of the surfboard's outer surface (e.g., the top deck 12, the bottom deck 14, or a side rail 17); and a concavity adjustment screw 30, which is configured for mating engagement with a concavity adjustment socket structure 40 as shown and further described below with reference to FIGS. 7A-9. An individual having ordinary skill in the relevant art will readily understand that the particular surfboard design shown and described with reference to FIGS. 6A-10 is provided for purpose of illustration to aid understanding, and that such a surfboard 10b can exhibit essentially any type of shape and/or design suitable for surfing or riding waves, for instance, longboard, mini-longboard, shortboard, funboard, retro-fish, or other (e.g., hybrid) designs. The second surfboard 10b typically includes fins (not shown) and a leg leash mount/cup/plug, in a manner analogous to that described above with respect to the first surfboard 10a.

As indicated in FIGS. 7A-8B, the surfboard 10b includes a set of pressurizable/inflatable baffle chamber structures 100a-c disposed or formed therein, where each baffle chamber structure 100a-c is fluidically coupled to an inflation/deflation valve 20a-c. Thus, any given baffle chamber structure 100a-c can be pressurized or inflated by way of an inflation/deflation valve 20a-c to provide a given section or segment of the surfboard 10b in which the baffle chamber structure 100a-c resides with an intended or desired level of stiffness or flex, which can be customized or adjusted in accordance with surf conditions and/or surfer preference. The depicted embodiment of the second surfboard 10b includes three baffle chamber structures 100a-c and three corresponding inflation/deflation valves 20a-c; however, an individual having ordinary skill in the relevant art will understand that an alternate embodiment can include additional or fewer baffle chamber structures 100a-c and/or inflation/deflation valves 20a-c, in a manner analogous to that described above.

Various embodiment include individual baffle elements 110 that extend lengthwise or generally lengthwise (e.g., along an arc, or a generally straight/straight direction, depending upon the baffle element 100 under consideration) between the second surfboard's tip 16 and tail 18. Additionally, as shown in FIGS. 7A and 7B and indicated in dashed line form in FIGS. 8A and 8B, in several embodiments individual baffle chamber structures 100a-c are delineated or defined, and hence fluidically separated or isolated from each other, by way of a dividing structure 150a,b that includes a number of dividing elements 160.

In multiple embodiments, each individual dividing element 160 is formed substantially or entirely internal to a single contiguous baffle element 110 that extends between adjacent baffle chamber structures 100a,b, 100b,c (e.g., where such dividing element 160 formation occurs as part of a 3D printing procedure, such as a single 3D printing procedure during which the second surfboard's underside 14, individual baffle elements 110 and dividing elements 160, and the second surfboard's top deck 12 are formed, in a manner readily understandable by an individual having ordinary skill in the relevant art). As a result, a single dividing element can effectively partition the single contiguous baffle element 110 in which it resides into multiple lengthwise aligned yet fluidically isolated baffle elements or baffle element segments/sections 110. Each dividing element 160 can thus serve as a structural and fluidic termination, border, boundary, or interface between corresponding lengthwise aligned baffle element sections 100 in adjacent baffle chamber structures 100a-c.

FIGS. 8A and 8B illustrate perspective views of the second surfboard 10b illustrating a representative internal appearance of the second surfboard 10b were the top deck 12 (and also the bottom deck 14) omitted or removed. In various embodiments, individual dividing elements 160 reside or are formed entirely internal to individual baffle elements 110. Hence, were the top deck 12 of the second surfboard 10b omitted or removed (or not completely fabricated), an observer would see only the baffle elements 110 disposed between the second surfboard's tip and tail portions 16, 18, and would not see the dividing elements 160 internal to such baffle elements 110. Representative positions of dividing elements 160 within baffle elements 110 are indicated in dashed line form in FIGS. 8A and 8B for purpose of illustration to aid understanding.

With respect to a pair of adjacent baffle chamber structures 110a,b, 110b,c defined by a selected dividing structure 150a,b, any given baffle element or baffle element section 110 disposed at a particular perpendicular distance away from a center line 11 of the second surfboard 10b line is separated and fluidically isolated from a corresponding lengthwise aligned baffle element or baffle element section 110 in the adjacent baffle chamber structure 100a,b, 100b,c by a dividing element 160. Typically, a single dividing element 160 separates and fluidically isolates a given pair of lengthwise aligned baffle elements or baffle element sections 110; however, in certain embodiments, a given baffle element or baffle element section 110 is fluidically terminated by its own distinct dividing element 110, such that a pair of dividing elements 160 is arranged in a back-to-back manner with respect to fluidically isolating a corresponding pair of lengthwise aligned baffle elements or baffle element sections 110.

As indicated in FIGS. 7-8D, individual baffle chamber structures 100a-c in embodiments of the second surfboard 10b need not or do not include projections 102 or gaps 104 configured for mating engagement with gaps 104 or projections 102 of an adjacent baffle chamber structure 100a-c. Rather, each dividing structure 150a,b generally extends, approximately extends, extends on average, or extends away from the centerline 11 of the second surfboard 10b along a predetermined direction or at a predetermined angle away from the centerline 11, and as indicated above each dividing structure 150a,b in several embodiments includes multiple individual dividing elements 160 that are formed internal to corresponding individual baffle elements 110 along this predetermined angle. More particularly, in various embodiments each dividing structure 150a,b extends away from portions of a central or center dividing element 160 corresponding to a set of central or center baffle elements or baffle element sections 110 within adjacent baffle chamber structures 100a,b, 100b,c in a direction toward the tail 18 of the second surfboard 10b, at an acute angle of between approximately 30-60 degrees (e.g., approximately 45 degrees) away from the surfboard's center line 11. Thus, the dividing structures 150a,b generally exhibit or exhibit a V-type shape relative to the second surfboard's center line 11. An individual having ordinary skill in the art will understand that in an alternate embodiment, different dividing structures 150a,b can extend away from the center line 11 of the second surfboard 10b at different angles, and/or one or more dividing structures 150a,b can exhibit a different shape (e.g., a generally U-type or C-type shape). In view of the foregoing, in various embodiments portions of a dividing structure 150a,b extend at a predetermined angle away from the surfboard's center line 11, on each of the left and right sides of the center line 11. For instance, a dividing structure 150a,b can be disposed or formed such that (a) the second surfboard's center line 11 extends perpendicularly or generally perpendicularly through a central or center portion of the dividing structure 150a,b, such as a central or center dividing element 160; and (b) other portions of the dividing structure 150a,b to the left and right of the dividing structure's central/center portion are disposed or formed further/progressively more outward from the center line 11 and further/progressively more longitudinally offset away from the central/center portion of the dividing structure 150a,b.

The combination of (a) a number of individual baffle elements 110 that extend lengthwise across some or each of the baffle chamber structures 100a-c, (b) dividing elements 160 formed internal to such baffle elements 110, and (c) an angular orientation of the dividing structures 150a,b and their constituent dividing elements 160 relative to the second surfboard's center line 11 such as described above can facilitate improved or greatly improved structural integrity of and distribution of forces upon the second surfboard 10b. Moreover, this type of second surfboard internal configuration can aid manufacturability of the second surfboard 10b with respect to certain 3D printing configurations/techniques.

As indicated in FIG. 9, the second surfboard 10b includes a concavity adjustment mechanism 30, 40 in a manner generally analogous, analogous, or essentially identical to that described above. The concavity adjustment mechanism 30, 40 can be disposed in and extend through a middle portion of the second surfboard 10b, such as in an opening or gap between fluidically isolated portions or segments of a central baffle element or baffle element section 110 of a central baffle chamber structure 100b. The concavity adjustment mechanism 30, 40 can include a concavity adjustment screw 30 having a threaded shaft 32 that engages with a concavity adjustment socket structure 40, in a manner analogous to that described above. The concavity adjustment socket structure can be integrally formed in and upwardly extend away from an upper inner surface of the second surfboard's bottom deck 14, such that the socket structure 40 resides internal to the surfboard 10a between the top deck 12 and the bottom deck 14. As the concavity adjustment screw 30 is turned in a given direction (e.g., clockwise or counterclockwise), engagement of the concavity adjustment screw's shaft 32 with the socket structure 40 selectively or selectably draws the socket structure 40 toward the second surfboard's top deck 12 to thereby increase the concavity of the bottom deck 14, or displaces the socket structure 40 away from the second surfboard's top deck 12 to thereby decrease the concavity of the bottom deck 14, in a manner that will be understood by one having ordinary skill in the relevant art.

As also indicated in FIG. 9, baffle elements 110 can be formed as hollow tubes or shafts, in a manner generally analogous, analogous, or essentially identical to that described above. Baffle elements 110 can have an elliptical, circular, or other type of shape, depending upon embodiment details. While the embodiment shown includes a single layer of baffle elements 110, in an alternate embodiment the second surfboard 10b can include multiple layers of baffle elements 110. The second surfboard 10b additionally includes stringers or stringer structures/elements 120 that extend lengthwise along the surfboard 10b, where each stringer 120 is typically disposed between two adjacent baffle elements or baffle sections 110, in a depression, indentation, crease, or crevice corresponding to upper or lower baffle element/baffle section borders between adjacent baffle elements/baffle sections 110. Some or all of the stringers 120 can extend lengthwise along the entire or substantially the entire length of the surfboard 10b; or some or all of the stringers 120 can extend lengthwise along the entire or substantially the entire length of one or more baffle chamber structures 100a-c, but not the entire or substantially the entire length of the surfboard 10b, as indicated above. The stringers 120 can be formed in a manner generally analogous, analogous, or essentially identical to that described above.

As indicated in FIG. 10, apertures that fluidically couple or link individual baffle elements/sections 110 together within a given baffle chamber structure 110a-c can be disposed or formed at one or more locations along the length(s) of such baffle elements/sections 110, in a manner analogous to that described above.

Aspects of particular embodiments of the present disclosure address at least one aspect, problem, limitation, and/or disadvantage associated with exiting water sports board designs, particularly surfboard designs, including designs that are partially manufacturable by way of 3D printing. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the disclosure. It will be appreciated by a person of ordinary skill in the art that several of the above-disclosed systems, components, processes, or alternatives thereof, may be desirably combined into other different systems, components, processes, and/or applications. In addition, various modifications, alterations, and/or improvements may be made to various embodiments that are disclosed by a person of ordinary skill in the art within the scope and spirit of the present disclosure.

The invention claimed is:

1. A water sports board having an outer surface and a length between a tip and a tail of the water sports board, the water sports board comprising:
   a top deck forming portions of the outer surface of the water sports board;
   a bottom deck forming portions of the outer surface of the water sports board;
   a set of baffle chamber structures disposed internal to the water sports board between the top deck and the bottom deck such that the top deck overlays the set of baffle chamber structures and the bottom deck underlies the set of baffle chamber structures, each individual baffle chamber structure within the set of baffle chamber structures including a plurality of baffle elements therein wherein for any selected baffle chamber structure each baffle element within the selected baffle chamber structure comprises a hollow elongate internal passage that is fluidically coupled to another baffle element within the selected baffle chamber structure;
   a set of inflation/deflation valves fluidically coupled to the set of baffle chamber structures, wherein each inflation/deflation valve is accessible from the outer surface of the water sports board; and
   a concavity adjustment screw accessible from the top deck, by which concavity of the bottom deck of the water sports board is adjustable.

2. The water sports board of claim 1, wherein each of the plurality of baffle elements extends in a lengthwise or generally lengthwise direction along portions of the length of the water sports board.

3. The water sports board of claim 1, further comprising left and right side rails between which the set of baffle chamber structures resides.

4. The water sports board of claim 1, wherein the set of baffle chamber structures includes a plurality of baffle chamber structures, each of which is disposed at a predetermined position along the length of the water sports board, and each of which is fluidically isolated from another of the baffle chamber structures, including a first baffle chamber structure and a second baffle chamber structure, wherein the first baffle chamber structure is disposed forward of the second baffle chamber structure along the length of the water sports board toward a tip portion of the water sports board, and the second baffle chamber structure is disposed rearward of the first baffle chamber structure toward a tail portion of the water sports board.

5. The water sports board of claim 4, wherein each of the baffle chamber structures is pressurizable/inflatable to provide a section of the water sports board in which the baffle chamber structure resides with an intended level of stiffness or flex.

6. The water sports board of claim 1, wherein at least one baffle chamber structure within the set of baffle chamber structures is pressurizable up to approximately 50 psi.

7. The water sports board of claim 1, wherein the set of baffle chamber structures includes a first baffle chamber structure, a second baffle chamber structure disposed rearward of the first baffle structure along the length of the water sports board, and a third baffle chamber structure disposed rearward of the second baffle chamber structure along the length of the water sports board, such that the first baffle chamber structure corresponds to a tip portion of the water sports board, the second baffle chamber structure corresponds to a middle portion of the water sports board, and the third baffle chamber structure corresponds to a tail portion of the water sports board, and wherein the first baffle chamber structure, the second baffle chamber structure, and the third baffle chamber structure are fluidically isolated from each other.

8. The water sports board of claim 1, wherein the concavity adjustment screw is accessible from the top deck, and is configured for threaded engagement with a concavity adjustment nut, plate, cup, and/or socket structure that extends above the bottom deck in a direction toward the top deck.

9. The water sports board of claim 1, wherein the top deck, the bottom deck, and the set of baffle chamber structures comprise materials manufacturable by way of 3D printing.

10. The water sports board of claim 1, wherein the top deck, the bottom deck, and the set of baffle chamber structures comprise materials manufacturable by way of a single 3D printing procedure.

11. The water sports board of claim 4, further comprising a dividing structure that fluidically isolates each baffle chamber structure from another baffle chamber structure.

12. The water sports board of claim 11, wherein the dividing structure is a generally V-shaped, U-shaped, or C-shaped structure that extends at a predetermined angle away from a center line of the water sports board, on each of a left side and a right side of the center line.

13. The water sports board of claim 11, wherein the dividing structure comprises a plurality of dividing elements, each dividing element at least partially formed internal to a baffle element.

14. The water sports board of claim 13, wherein each dividing element is formed entirely internal to a baffle element, and wherein the top deck, the bottom deck, the set of baffle chamber structures, and the set of dividing structures comprise materials manufacturable by way of 3D printing.

15. The water sports board of claim 13, wherein each dividing element is formed entirely internal to a baffle element, and wherein the top deck, the bottom deck, the set of baffle chamber structures, and the set of dividing structures comprise materials manufacturable by way of a single 3D printing procedure.

16. A water sports board having an outer surface and a length between a tip and a tail of the water sports board, the water sports board comprising:
   a top deck forming portions of the outer surface of the water sports board;
   a bottom deck forming portions of the outer surface of the water sports board;
   a plurality of baffle chamber structures disposed internal to the water sports board between the top deck and the bottom deck such that the top deck overlays the plurality of baffle chamber structures and the bottom deck underlies the set of baffle chamber structures, each individual baffle chamber structure within the plurality of baffle chamber structures including a plurality of baffle elements therein, wherein for any selected baffle chamber structure each baffle element within the selected baffle chamber structure comprises a hollow elongate internal passage that is fluidically coupled to another baffle element within the selected baffle chamber structure, and wherein the plurality of baffle chamber structures includes a first baffle chamber structure and a second baffle chamber structure disposed rearward of the first baffle chamber structure along the length of the water sports board such that the first baffle chamber structure resides closer to a tip portion of the water sports board than the second baffle chamber structure;

a set of dividing structures, each dividing structure fluidically isolating one baffle chamber structure of the plurality of baffle chamber structures from another baffle chamber structure of the plurality of baffle chamber structures, each dividing structure extending at an acute angle of between approximately 30-60 degrees away from a center line of the water sports board, on each of a left side and a right side of the center line; and a plurality of inflation/deflation valves fluidically coupled to the plurality of baffle chamber structures, wherein the plurality of inflation/deflation valves includes a first inflation/deflation valve corresponding to the first baffle chamber structure and a second inflation/deflation valve corresponding to the second baffle chamber structure, and wherein each inflation/deflation valve is accessible from the outer surface of the water sports board.

* * * * *